(12) United States Patent
Pietravalli et al.

(10) Patent No.: US 10,914,161 B2
(45) Date of Patent: Feb. 9, 2021

(54) TOOL FOR MEASURING CORROSION IN OIL WELLS AND METHOD FOR MEASURING CORROSION

(71) Applicant: YPF SOCIEDAD ANÓNIMA, Buenos Aires (AR)

(72) Inventors: Gianni Pietravalli, General Roca (AR); Eduardo Yoldes, Plaza Huincul (AR)

(73) Assignee: YPF SOCIEDAD ANONIMA, Cuidad Autonoma de Buenos Aires (AR)

( * ) Notice: Subject to any disclaimer, the term of this patent is extended or adjusted under 35 U.S.C. 154(b) by 57 days.

(21) Appl. No.: 16/458,631

(22) Filed: Jul. 1, 2019

(65) Prior Publication Data

US 2020/0003044 A1 Jan. 2, 2020

(30) Foreign Application Priority Data

Jul. 2, 2018 (AR) .............................. P20180101839

(51) Int. Cl.
| | | |
|---|---|---|
| *E21B 47/01* | (2012.01) | |
| *G01N 17/04* | (2006.01) | |
| *E21B 49/08* | (2006.01) | |
| *E21B 23/02* | (2006.01) | |
| *E21B 41/02* | (2006.01) | |
| *E21B 47/00* | (2012.01) | |

(52) U.S. Cl.
CPC .............. *E21B 47/01* (2013.01); *E21B 23/02* (2013.01); *E21B 41/02* (2013.01); *E21B 47/00* (2013.01); *E21B 49/08* (2013.01); *G01N 17/046* (2013.01)

(58) Field of Classification Search
CPC .......... E21B 47/01; E21B 23/02; E21B 49/08; E21B 47/00; E21B 41/02; G01N 17/046
See application file for complete search history.

(56) References Cited

U.S. PATENT DOCUMENTS

| | | |
|---|---|---|
| 4,688,638 A | 8/1987 | Williams |
| 4,928,760 A | 5/1990 | Freitas |
| 6,131,659 A * | 10/2000 | Johnson .................. E21B 47/00 166/250.05 |

(Continued)

FOREIGN PATENT DOCUMENTS

| | | |
|---|---|---|
| CN | 203559897 U | 4/2014 |
| WO | WO2016153522 A1 | 9/2016 |

*Primary Examiner* — Yong-Suk (Philip) Ro
(74) *Attorney, Agent, or Firm* — Muncy, Geissler, Olds & Lowe, P.C.

(57) ABSTRACT

A corrosion measuring tool for controlling corrosion in an oil well with a tubing has a hollow cylindrical barrel, a hollow element, an expandable sleeve, at least one coupon for corrosion measurement and an elongated member. The hollow element is located at the upper end of the hollow cylindrical barrel and has a conical upper portion and a cylindrical lower portion. The cylindrical lower portion is slidable within the barrel. The cylindrical lower portion has linkage and sliding retention. An expandable sleeve is located at the upper end of the hollow cylindrical barrel, below the conical upper portion. The sleeve has a fastener. Movement of the hollow element relative to the barrel in a downward direction causes the conical upper portion to expand the expandable sleeve. Movement of the hollow element in an upwardly direction releases the expandable sleeve to separate the fastener from the tubing.

12 Claims, 2 Drawing Sheets

(56) References Cited

U.S. PATENT DOCUMENTS

| | | | |
|---|---|---|---|
| 2006/0230846 A1* | 10/2006 | Smith | E21B 47/01 |
| | | | 73/866.5 |
| 2010/0206064 A1* | 8/2010 | Estes | G01B 7/10 |
| | | | 73/152.57 |
| 2015/0377765 A1* | 12/2015 | Chilukuri | G01B 11/0675 |
| | | | 356/73.1 |
| 2018/0106141 A1* | 4/2018 | Fouda | E21B 47/00 |

* cited by examiner

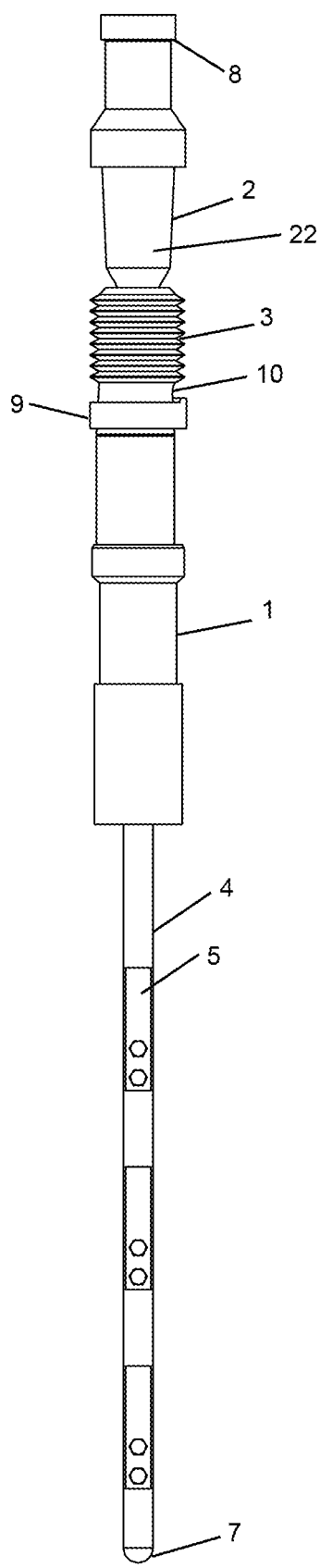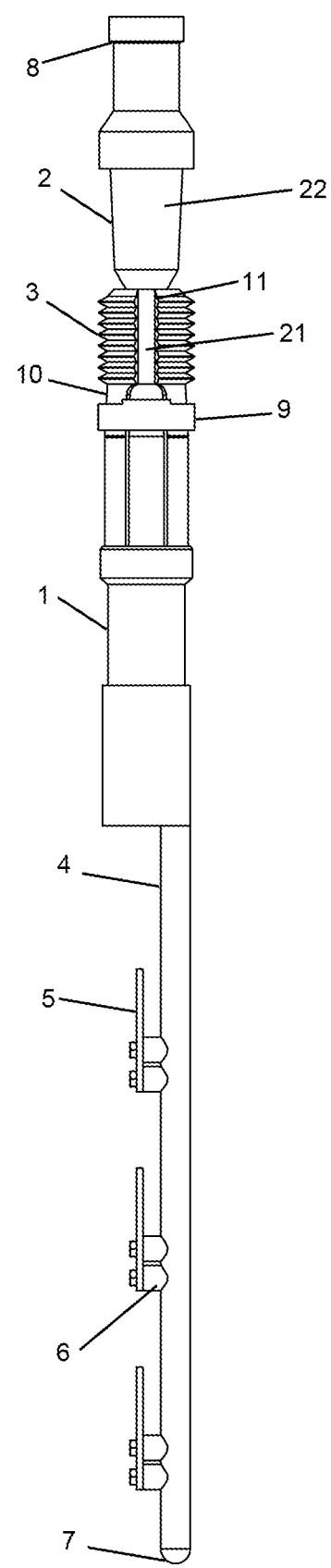
FIG. 1A
FIG. 1B

TOOL FOR MEASURING CORROSION IN OIL WELLS AND METHOD FOR MEASURING CORROSION

FIELD OF THE INVENTION

The present invention refers to a tool that allows evaluating corrosive processes and also bacteriological processes in both injection and production oil wells, by mechanically fixing a tool to a desired well depth to be analyzed. Also, the present invention refers to a method by means of which a variety of data are obtained enabling an integral evaluation of the system.

BACKGROUND OF THE INVENTION

Predictive programs of water tendencies inform about corrosive processes to which the wells are subjected to, but said programs are conservative and when defining mitigation methods, they are conditioned by theoretical results. In addition to corrosive processes, bacteriological processes are also present. Both types of processes work synergistically resulting in a considerably more aggressive process.

Devices for corrosion measurement in wells by means of coupons are well known in the prior art. For instance, U.S. Pat. No. 4,688,638 A (ConocoPhillips Holding Co.) discloses a system for fixing coupons for measuring corrosion. Said system consists of positioning a coupon that monitors corrosion in the production flow path inside a production well. Preferably, the coupons are cylindrical and are firmly held in a cylindrical housing suspended without contact with any other metallic surface.

In US '638, the method for fastening the device to a pipe employs a nipple without using clamps and the coupon distribution is made inside the cylindrical body so they are not really in the flow conditions existing inside the pipe.

Another document corresponding to the same field of the invention is U.S. Pat. No. 4,928,760 A (Chevron Research and Technology Co.) directed to a hanging device to be placed in a well at an arbitrary depth for corrosion control or measurement therein by means of coupons.

The device of patent US '760 allows fluid flow around it, enabling corrosion measurement when the well is in production. The device is not fastened to the pipe, but hanging, with complicated installation and maintenance during the measurement operation.

Another patent document related to the field of the invention is utility model CN 203559897 U (China Petroleum & Chemical Corporation—Sinopec Southwest Oil & Gas Company) directed to a device to be placed in a well at an arbitrary depth for corrosion control or measurement in wells by means of coupons. In this case, there is only one coupon and the fluid does not flow through it, so obtained measurements may not be representative of actual corrosion.

Similarly, patent application WO 2016/153522 A1 (Halliburton Energy Services) is directed to a device for corrosion measurement in oil wells by means of coupons. In said document, a device for corrosion measurement in a drill string by means of a plurality of coupons is described. This device is not an independent element nor can it be arbitrary positioned at a desired depth.

Consequently, there is a need of a tool that allows simplified installation and removal thereof, allowing a prolonged operation time inside an oil well without affecting well production and whose coupon distribution does not alter fluid flow.

BRIEF DESCRIPTION OF THE INVENTION

Based on the above considerations, the present invention provides a solution to the aforementioned problems by providing a tool capable of analyzing corrosion at the depth in which the most severe scenarios affecting the integrity of the subsurface installation can be found.

For the purposes of the present invention, the term "hollow cylindrical barrel" means a generally cylindrical hollow body. The terms "cylindrical barrel" or "cylindrical body" will be used interchangeably in the present application. The positional references, e.g., "above", "below", "upper", "lower", "upwardly", "downwardly" and the like, are used considering the tool of the invention in a vertical position.

For the purposes of the present invention, the terms "coupons" or "samples" will be used interchangeably to refer to metallographic elements used to determine corrosion. Similarly, in reference to the oil well, the terms "tubing" or "piping" are used interchangeably for the purposes of the present invention.

Consequently, in a first aspect it is an object of the present invention a corrosion measuring tool for controlling corrosion in an oil well comprising a tubing, wherein the tool comprises:

- a hollow cylindrical barrel comprising a cylindrical wall, an upper end and a lower end;
- a hollow element located at the upper end of the hollow cylindrical barrel, wherein said hollow element comprises a conical upper portion and a cylindrical lower portion, the cylindrical lower portion being capable of sliding within the upper end of the barrel, wherein the cylindrical lower portion has linkage and retention sliding means to link and retain the hollow cylindrical barrel;
- expandable means located at the upper end of the hollow cylindrical barrel, below the conical upper portion, comprising fastening means to the tubing, wherein the movement of the hollow element in a downwardly direction relative to the barrel causes the conical upper portion to penetrate into the expandable means, forcing the expandable means to expand outwardly, putting in contact said fastening means with the tubing, while the movement of the hollow element in an upwardly direction relative to the barrel releases the expandable means to retract inwardly and separates the fastening means from the tubing;
- at least one coupon for corrosion measurement; and
- an elongated member longitudinally and eccentrically fixed at the lower end of the barrel comprising mounting means for each of the at least one coupon, wherein the mounting means are aligned along the elongated member.

In a preferred embodiment of the present invention, the at least one coupon comprises a plurality of coupons, preferably a plurality of elongated coupons.

In an embodiment of the present invention, the expandable means consist of a portion of the cylindrical wall of the upper end of the hollow cylindrical barrel that has at least one longitudinal cut allowing its expansion and wherein the fastening means are fixed to an external face of said portion of the cylindrical wall.

In a more preferred embodiment of the present invention, the expandable means consists of a portion of the cylindrical wall of the upper end of the hollow cylindrical barrel that has at least two longitudinal cuts, preferably two longitudinal cuts, allowing its expansion and wherein the fastening means are fixed to the external face of said portion of the cylindrical wall.

In a preferred embodiment of the present invention said fastening means comprise clamps.

In another preferred embodiment of the present invention, the linkage and retention sliding means of the cylindrical lower portion of the hollow element comprises a coaxial ring that surrounds the expandable means that, upon the upward movement of the hollow element, forces the expandable means to retract inwardly and separate the fastening means from the tubing.

In an embodiment of the present invention, the at least one coupon is of a band type.

In another embodiment of the present invention, the at least one coupon is of a flash type, i.e., strip type.

In a preferred embodiment of the present invention, the mounting means perpendicularly protrude from the elongated member, holding the at least one coupon spaced apart from the elongated member and vertically oriented.

In a second aspect, it is an object of the present invention a method for measuring corrosion in an oil well comprising the following steps:
- lowering the tool of the present invention by means of slickline or wireline equipment, to the desired depth where the corrosion analysis is to be performed;
- stopping the lowering of the tool once it is positioned by suddenly releasing the wire or cable, allowing the conical upper portion to penetrate into the expandable means, to displace downwardly the linkage and retention sliding means of the cylindrical lower portion of the hollow element and forcing the expansion of the expandable means and, in turn, putting in contact the fastening means with the tubing, thereby securing the tool inside the oil well;
- starting-up the oil well under production conditions during a specified period of time;
- stopping the oil production once the specified period of time has elapsed;
- releasing and removing the tool by means of said slickline or wireline equipment, moving upwards said hollow element so as to release the expandable means and separate the fastening means of the tubing, remove the tool from the oil well, separate the coupons from the mounting means and proceed with the analysis of the corrosion occurred.

BRIEF DESCRIPTION OF THE FIGURES

FIG. 1A is a front view of the tool of the present invention showing the tool in released position, that is, with the conical upper portion outside of the expandable means of the upper portion of the hollow cylindrical barrel or body.

FIG. 1B is a side view of the tool of the present invention showing the tool in released position, that is, with the conical portion outside of the expandable means of the upper portion of the hollow cylindrical barrel or body.

FIG. 3A shows the initial stage with the conical upper portion not inserted. FIG. 3B shows the conical upper portion partially inserted which generates a slight expansion of the expandable means, and a corresponding downward displacement of the linkage and retention sliding means. FIG. 3C shows the conical upper portion completely inserted achieving the complete expansion of the expandable means and the linkage and retention sliding means in its lower position.

DETAILED DESCRIPTION OF THE INVENTION

The present invention will be described in greater detail below, with reference to the appended figures illustrating a preferred exemplary embodiment of the invention, which should not be construed as limiting thereof.

In the figures, same reference numbers are applied for designating same elements of the device of the invention.

The present invention refers to a tool that allows evaluating corrosive processes and also bacteriological processes in production and injection wells, by mechanically fixing the tool of the invention to the desired well depth to be analyzed.

Figure 2:
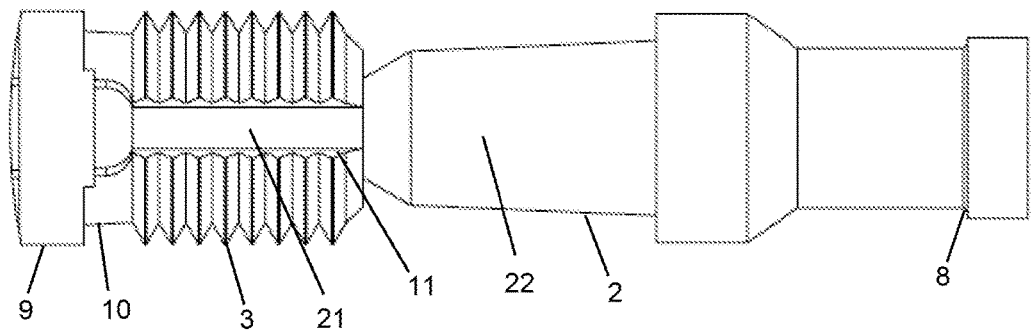
FIG. 2 is a detailed side view of the upper portion of the tool of the present invention showing the conical upper portion and the expandable means of the upper portion of the hollow cylindrical barrel or body.
Figures 3A, 3B, 3C:
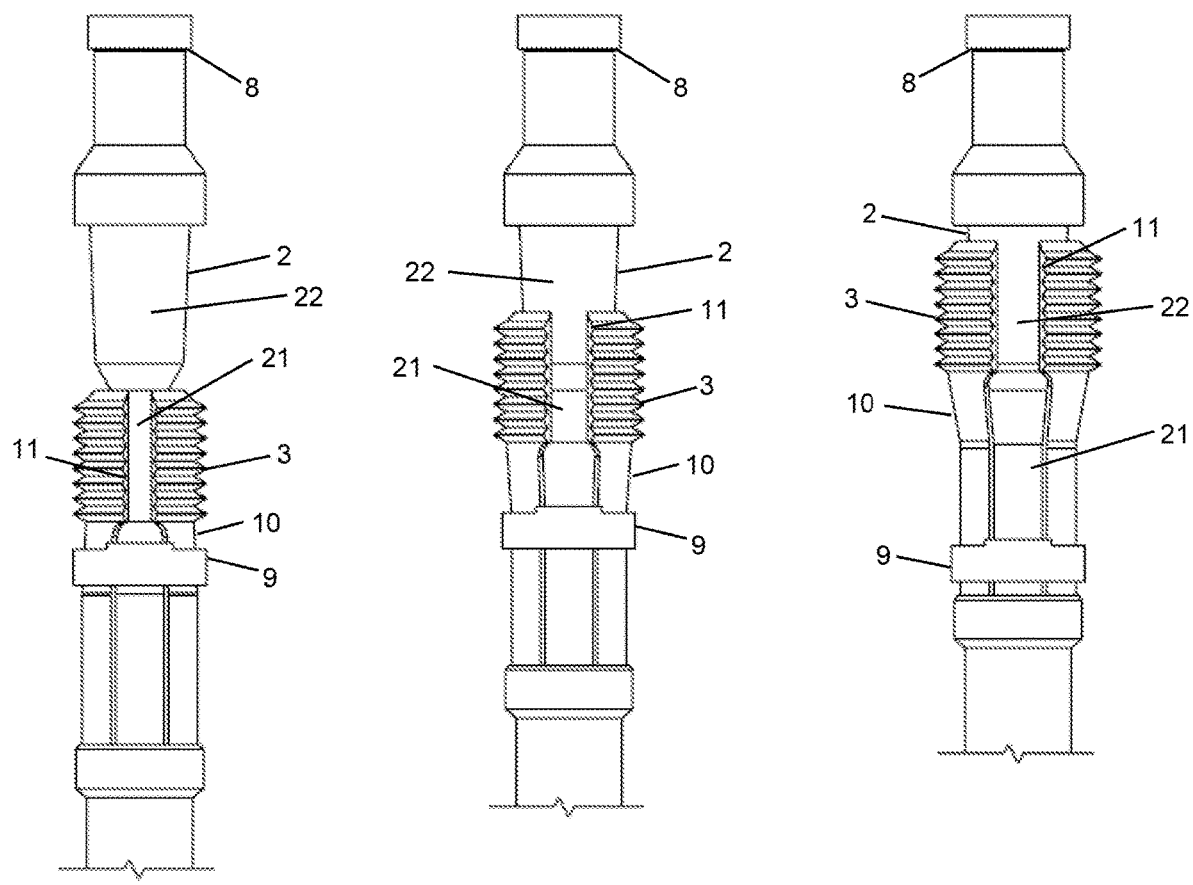
FIGS. 3A-3C show three stages where the conical upper portion is being introduced into the expandable means of the upper portion of the hollow cylindrical barrel or body, forcing the expansion of the expandable means.

FIG. 1A shows a front view of the tool of the present invention. FIGS. 1B, 2 and 3A-3C show a right side view of the tool and its details, being identical to the left side view, not shown.

In the preferred embodiment of the invention, illustrated in the Figures, the tool comprises a hollow cylindrical barrel or body 1, a hollow element 2, an elongated member 4, and a plurality of coupons or samples 5 fixed to elongated member 4.

As it can be seen in FIG. 1B, and in greater detail in FIGS. 2 and 3A-3C, the hollow cylindrical barrel or body 1 has a pair of longitudinal cuts 11 in the wall of an upper end thereof forming two separated wall portions constituting expandable means 10, in a diametrically opposite location.

Surrounding said expandable means 10, the tool of the present invention has a plurality of clamps 3 for fastening the tool to the well tubing.

As it can be appreciated from the Figures, the hollow element comprises a coupling lip 8, a conical upper portion 22, a cylindrical lower portion 21 and ring-shaped linkage and retention sliding means 9 that surrounds the expandable means 10 and that is joined to the cylindrical lower portion 21 through the longitudinal cuts 11.

As it can be appreciated in FIGS. 1A and 1B, the elongated member 4 has a plurality of coupons 5 fixed to respective mounting means 6.

The tool is designed to allow liquid and gaseous fluids contacting the entire surface of each coupon or sample 5 in a symmetrical manner, without alterations in the flow that produce variations in the corrosion process of the coupon 5 and, consequently, an erroneous evaluation of the results.

For this purpose, coupons 5 are located aligned with the hollow center of the cylindrical barrel or body 1, where the fluid passes through, since the elongated member 4 is located eccentrically, that is, spaced apart from the axis of the hollow cylindrical barrel or body 1. Due to the shape of the tool, it is not possible for coupons 5 to come into contact with the tubing surface, being subjected only to contacting the fluid.

In the tool of the present invention, a plurality of band type or flash type coupons 5 can be used.

The tool of the present invention is applied in wells that have their production/injection piping (tubing or casing) free, without downhole pump drive systems (strings) or capillary technology.

The tool of the present invention allows the use of multiple different metallography types. In this way and using for example three coupons 5 of different metallography types, from one metallography type the condition of the well installation can be analyzed and the two remaining metallography types allow defining the metal behavior in relation to the well operation condition.

The tool of the present invention is versatile since it can be secured to any location where the measurement/control of corrosion is to be carried out. The securing is achieved by expandable means 10 and clamps 3 which are actuated by slickline/wireline equipment.

The tool of the present invention has isolated mounting means 6 for mounting coupons or samples 5, whereby said coupons or samples 5 will be directly subjected to natural conditions of the oil well, without being subjected to flow, pressure and temperature changes, or to any possible chamber that modifies the internal diameter of the tubing being analyzed.

In a preferred embodiment, mounting means 6 are manufactured based on a resistant polymeric material, for example Teflon. Mounting means 6 may comprise washers with lips to be introduced in holes of coupons or samples 5. Thus, coupons or samples 5 are completely isolated from the tool and any metallic part, thereby avoiding metal-to-metal contact and, in turn, a possible galvanic corrosion. In this way, possible corrosion measurement errors are avoided.

The tool of the present invention, in a preferred embodiment, has a rounded lower end 7 of elongated member 4 in order to avoid the generation of turbulence and avoid subjecting coupons or samples 5 to flow changes.

The tool of the present invention can be left installed in the oil well for the desired or necessary period of time without interfering with the well operation.

Installation of the Tool

In the method of the invention, the tool is introduced into the well by means of slickline or wireline equipment down to desired depth. In general, the wireline is preferred because it makes it easier to secure the tool in the selected place and allows working at faster descent and ascent rates, minimizing production loss times. The weight of the tool keeps clamps 3 closed since linkage and retention sliding means 9 keeps the expandable means 10 retracted, allowing a free descent.

The descent is stopped once the tool is positioned at the point where the corrosion analysis is to be carried out. This point will be given generally by results of predictive programs, as described below. At this point, the wire or cable from the slickline or wireline equipment, respectively, are suddenly released, allowing the conical upper portion 22 to be inserted into expandable means 10, thereby displacing downwards the linkage and retention sliding means 9 and causing expansion of expandable means 10 and, in turn, displacing clamps 3 against the tubing.

Once clamps 3 have been opened, the securing against the tubing is achieved. Afterwards, the tool is impacted by a jar, forcing clamps 3 to a complete securing, which then allows putting the well into production without displacement of the tool.

The equipment for holding the tool of the present invention during descent down to the desired point is typically referred to as "overshot" or "fishing tool". The overshot is maneuvered by a wire or cable. The fastening to the tool of the present invention is achieved by means of clamps or nails located in the lower part of the overshot, which cling to the coupling lip 8 which is in the upper part of hollow element 2 corresponding to a so called "header" of the tool.

The overshot has bronze screws which by means of impacts with a jar designed for this task, releases the clamps, and these, in turn, release the tool.

On the surface, fishing maneuvers are carried out in order to verify the work carried out by the overshot, checking that an optimum coupling with the tool of the present invention is achieved and correcting any inconvenient, if any, prior to the descent maneuver.

When the lowering of the tool of the present invention is about to begin, upper and lower master valves of the well are closed. This allows mounting and dismounting of "Christmas tree" header and mounting a lubricator to lower the tool. Through the lubricator the wire or cable responsible of taking the tool to the desired position will pass. Then, upper and lower master valves are opened and the lowering is carried out. Once said tool is secured, the overshot is unfastened and it is raised for its removal. Once removed on the surface, the upper and lower master valves are closed, the lubricator is removed, the upper part of the well is reassembled and the corresponding valves are opened for the well start-up.

Thus, once installed the tool, the well is put into production. The coupons or samples 5 are installed upstream of the tool, in production wells, avoiding turbulences and flow changes. In addition, since the installed tool is hollow, the production does not suffer a considerable variation, allowing to maintain the well flow and pressure, subjecting the coupon 5 to the actual well operation conditions. In this way, there is no interference with the corrosion measurement results that could lead to an erroneous assessment of the conditions to which the well installation is subjected.

Method of Corrosion Measurement

Predictive programs allow the evaluation of conditions to which the oil production system is subjected, but the samples and data that are considered are those from the surface. These data do not correspond to the conditions the installation is actually subjected since they depend on depth gradient, different pressures and temperatures, and fluid behavior.

Therefore, surface data are collected and used as an input of a predictive program the results of which are considered for evaluation. The resulting graph of said type of programs indicates the sectors where corrosion is located.

Once the corrosion location is identified, the tool is programmed to descend to said place with coupons 5 of different metallography types where they will be exposed to the well conditions for a certain amount of time, according to the type and aggressiveness of predominant corrosion.

Removal of the Tool

At the end of the coupon exposure period, the well is closed by means of the general shut-off valves, the lubricator is mounted, the upper and lower master valves are opened and the overshot is lowered down to the tool of the present invention. The overshoot fastens to coupling lip 8 of the tool header through the clamps present in its lower part, it lifts the hollow element 2 that, when ascending with linkage and retention sliding means 9, retracts the expandable means 10 and clamps 3, releasing the tool which is lifted up to the surface. Then, the lubricator is removed, the upper part of the well is reassembled and the shut-off valves are opened to start up the well.

Once the tool is on the surface, coupons 5 are removed and subjected to different analyses such as digital photography, scanning electron microscopy, X-ray diffraction, among others, to obtain data.

The tool of the invention allows obtaining different types of information, such as:

1. Attack morphology
2. Calculation of MPY (Mils per year) or to thousandths of an inch per year. This unit used in the art expresses the rate or speed of corrosion of a metallic surface.
3. Remaining life considering corrosion taken at the moment.
4. Evaluation of different metallography types for the particular case of well under analysis or wells of similar conditions.
5. Corroborate the veracity of a predictive program based on verifying if there is a difference between the corrosion of the coupon and the corrosion predicted by the program, allowing to carry out a correction of the program.

The embodiments described herein by way of illustration may be carried out properly in the absence of any element or elements, limitation or limitations, not specifically described herein. Thus, for example, the terms "comprising", "including", "containing", etc., should be read in a broad manner and without limitation. In addition, the terms and expressions used herein have been used as terms of description and not of limitation and there is no intention in the use of such terms and expressions to exclude any equivalent of the features or portions thereof shown and described, but it is recognized that various modifications are possible within the scope of the invention. Thus, it is to be understood that although the present embodiments have been specifically described by preferred embodiments and optional features, modifications and variations thereof can be conceived by those experts in the art and such modifications and variations are considered within the scope of the invention.

The invention claimed is:

1. A corrosion measuring tool for controlling corrosion in an oil well comprising a tubing, the tool comprising:
   a hollow cylindrical barrel comprising a cylindrical wall, an upper end and a lower end;
   a hollow element located at the upper end of the hollow cylindrical barrel, wherein said hollow element comprises a conical upper portion and a cylindrical lower portion, the cylindrical lower portion being capable of sliding within the upper end of the barrel, wherein the cylindrical lower portion has linkage and sliding retention to link and retain the hollow cylindrical barrel;
   expandable sleeve located at the upper end of the hollow cylindrical barrel, below the conical upper portion, comprising a fastener to the tubing, wherein a movement of the hollow element in a downwardly direction relative to the barrel causes the conical upper portion to penetrate into the expandable sleeve, forcing the expandable sleeve to expand outwardly, putting in contact said fastener with the tubing, while a movement of the hollow element in an upwardly direction relative to the barrel releases the expandable sleeve to retract inwardly and separates the fastener from the tubing;
   at least one coupon for corrosion measurement; and
   an elongated member longitudinally and eccentrically fixed at the lower end of the barrel comprising a mount for each of the at least one coupon, wherein the mounts are aligned along the elongated member.

2. The tool according to claim 1, wherein the at least one coupon comprises a plurality of coupons.

3. The tool according to claim 1, wherein the at least one coupon comprises a plurality of elongated coupons.

4. The tool according to claim 1, wherein that the expandable sleeve comprises a portion of the cylindrical wall of the upper end of the hollow cylindrical barrel that has at least one longitudinal cut allowing expansion of the sleeve and wherein the fastener is fixed to an external face of said portion of the cylindrical wall.

5. The tool according to claim 1, wherein that the expandable sleeve comprises a portion of the cylindrical wall of the upper end of the hollow cylindrical barrel that has at least two longitudinal cuts allowing expansion of the sleeve and wherein the fastener is fixed to the external face of said portion of the cylindrical wall.

6. The tool according to claim 5, wherein the expandable sleeve comprises a portion of the cylindrical wall of the upper end of the hollow cylindrical barrel that has two longitudinal cuts.

7. The tool according to claim 1, wherein said fastener comprises clamps.

8. The tool according to claim 1, wherein the linkage and sliding retention of the cylindrical lower portion of the hollow element comprises a coaxial ring that surrounds the expandable sleeve that, upon the upward movement of the hollow element, forces the expandable sleeve to retract inwardly and separate the fastener from the tubing.

9. The tool according to claim 1, wherein the at least one coupon is of a band type.

10. The tool according to claim 1, wherein the at least one coupon is of a flash type.

11. The tool according to claim 1, wherein the mounts perpendicularly protrude from the elongated member, holding the at least one coupon spaced apart from the elongated member and vertically oriented.

12. A method for measuring corrosion in an oil well by means of the tool of claim 1, wherein the method comprises the following steps:
   lowering the tool by slickline or wireline equipment, to a desired depth where a corrosion analysis is to be performed;
   stopping the lowering of the tool once the tool is positioned by suddenly releasing the wire or cable, allowing the conical upper portion to penetrate into the expandable sleeve, to displace downwardly the linkage and sliding retention of the cylindrical lower portion of the hollow element and forcing the expansion of the expandable sleeve and, in turn, putting in contact the fastener with the tubing, thereby securing the tool inside the oil well;
   starting-up the oil well under production conditions during a specified period of time;
   stopping the oil production once the specified period of time has elapsed;
   releasing and removing the tool by said slickline or wireline equipment, moving upwards said hollow element so as to release the expandable sleeve and separate the fastener of the tubing, remove the tool from the oil well, separate the coupons from the mounts and proceed with the analysis of the corrosion occurred.

* * * * *